(12) United States Patent
Amberkar et al.

(10) Patent No.: US 6,965,820 B2
(45) Date of Patent: Nov. 15, 2005

(54) ROBUST STEERING-PULL TORQUE COMPENSATION

(75) Inventors: Sanket S. Amberkar, Ann Arbor, MI (US); Ashok Chandy, Fenton, MI (US); Kathryn L. Pattok, Wiesbaden (DE); Mark P. Colosky, Saginaw, MI (US); William Chin-Woei Lin, Troy, MI (US); Weiwen Deng, Sterling Heights, MI (US); Yuen-Kwok Chin, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 339 days.

(21) Appl. No.: 09/954,886

(22) Filed: Sep. 18, 2001

(65) Prior Publication Data

US 2003/0055543 A1    Mar. 20, 2003

(51) Int. Cl.[7] .................... A01B 69/00; B62D 11/00; B63G 8/20; G05D 1/00
(52) U.S. Cl. .................... 701/41; 701/42; 701/443; 180/446
(58) Field of Search ................ 701/41, 42, 43; 180/410, 420, 421, 443, 446; 280/89.11, 280/93.501

(56) References Cited

U.S. PATENT DOCUMENTS

| | | | | |
|---|---|---|---|---|
| 4,509,611 A | * | 4/1985 | Kade et al. ............ | 180/446 |
| 4,687,976 A | * | 8/1987 | Shimizu ............... | 318/432 |
| 4,856,607 A | * | 8/1989 | Sueshige et al. ....... | 180/422 |
| 5,000,278 A | * | 3/1991 | Morishita .............. | 180/446 |
| 5,048,630 A | * | 9/1991 | Schaffer ............... | 180/422 |
| 5,053,966 A | * | 10/1991 | Takahashi et al. ...... | 701/41 |
| 5,309,373 A | * | 5/1994 | Beebe et al. .......... | 702/41 |
| 5,339,243 A | * | 8/1994 | Matsuoka et al. ....... | 701/43 |
| 5,465,210 A | * | 11/1995 | Walenty ............... | 701/1 |
| 5,473,539 A | * | 12/1995 | Shimizu et al. ........ | 701/41 |
| 5,527,053 A | * | 6/1996 | Howard ................ | 280/90 |
| 5,528,497 A | * | 6/1996 | Yamamoto et al. ...... | 701/41 |
| 5,668,722 A | | 9/1997 | Kaufmann et al. ...... | 701/41 |

(Continued)

FOREIGN PATENT DOCUMENTS

EP    0822130 A1 *  2/1998

OTHER PUBLICATIONS

Akhan, M.B et al., "Electric power assisted steering", Sep. 25, 1998, DSP Chips in Real Time Measurement and Control(Digest1998).*

Primary Examiner—Thomas G. Black
Assistant Examiner—Brian J. Broadhead
(74) Attorney, Agent, or Firm—Michael D. Smith

(57) ABSTRACT

A controller (32) for a vehicular system (10) that includes a hand-wheel (16) and an electric motor (34) includes a torque-assist function (56) responsive to a signal representing the torque applied to the hand-wheel (16) for providing a torque-assist command to the motor (34), and a steering-pull compensator (52) responsive to a signal representing a valid ignition cycle for modifying the torque-assist command to the motor (34) by an offset corresponding to a detected steering-pull condition; where the method of control includes receiving the signal indicative of the torque applied to the hand-wheel (16), providing a torque-assist command to the motor (34) in response to the received torque signal, detecting an enabling signal related to the signal representing a valid ignition cycle, quantifying a steering-pull condition in response to the received and detected signals, and modifying the torque-assist command to the motor (34) by an offset corresponding to the quantified steering-pull condition.

27 Claims, 3 Drawing Sheets

U.S. PATENT DOCUMENTS

| | | | | |
|---|---|---|---|---|
| 5,828,973 A | * | 10/1998 | Takeuchi et al. | 701/41 |
| 5,941,338 A | * | 8/1999 | Miller et al. | 180/421 |
| 5,948,030 A | | 9/1999 | Miller et al. | 701/41 |
| 6,039,144 A | | 3/2000 | Chandy et al. | 180/446 |
| 6,050,360 A | | 4/2000 | Pattok et al. | 180/446 |
| 6,250,421 B1 | * | 6/2001 | Poshadlo | 180/446 |
| 6,272,947 B1 | * | 8/2001 | Howard | 74/499 |
| 6,349,789 B1 | * | 2/2002 | Nakano et al. | 180/446 |
| 6,360,841 B1 | * | 3/2002 | Blandino et al. | 180/443 |
| 6,367,576 B1 | | 4/2002 | Rodenas et al. | 180/446 |
| 6,370,459 B1 | * | 4/2002 | Phillips | 701/41 |
| 6,408,234 B1 | | 6/2002 | Wittig | 701/41 |
| 6,499,559 B2 | | 12/2002 | McCann et al. | 180/446 |
| 6,516,680 B1 | * | 2/2003 | Nakamura et al. | 74/388 PS |
| 6,520,520 B2 | * | 2/2003 | Howard | 280/90 |
| 2002/0022912 A1 | * | 2/2002 | Urabe et al. | 701/41 |
| 2002/0188389 A1 | * | 12/2002 | Ashrafi | 701/29 |

* cited by examiner

ROBUST STEERING-PULL TORQUE COMPENSATION

BACKGROUND

In a vehicle equipped with an electric power steering ("EPS") system, for example, the steering assist torque is provided by an electric motor that is typically coupled to a steering column or shaft. A steering or hand-wheel is also typically coupled to the steering column or shaft in order for a driver to steer the vehicle. When the driver wants to travel substantially straight ahead, the hand-wheel is rotated to a generally centered neutral position having a neutral effect on the direction of travel. However, due to mechanical tolerances and other conditions, the hand-wheel may need to be rotated a small amount away from center to steer the vehicle substantially straight ahead.

Under such off-center conditions, the driver may or may not need to provide any input torque in order to keep the hand-wheel at this neutral position, depending on whether there is any torque coming from the steering system that tends to rotate the hand-wheel clockwise or counter-clockwise. In the cases where the hand-wheel is pulled slightly in one direction, the driver must exert some force to prevent the vehicle from deviating from the intended path. This phenomenon is commonly known as "steering-pull", which can be caused by many factors such as, for example, tire properties of ply steer or conicity, camber or caster misalignment at the front end, prevailing wind, and road surface or crown.

SUMMARY

The above described and other features are exemplified by the following Figures and Description in which a controller for a vehicular system that includes a hand-wheel and an electric motor is disclosed that includes a torque-assist function responsive to a signal representing the torque applied to the hand-wheel for providing a torque-assist command to the motor, and a steering-pull compensator responsive to a signal representing a valid ignition cycle for modifying the torque-assist command to the motor by an offset corresponding to a detected steering-pull condition; and the method of control includes receiving the signal indicative of the torque applied to the hand-wheel, providing a torque-assist command to the motor in response to the received torque signal, detecting an enabling signal related to the signal representing a valid ignition cycle, quantifying a steering-pull condition in response to the received and detected signals, and modifying the torque-assist command to the motor by an offset corresponding to the quantified steering-pull condition.

BRIEF DESCRIPTION OF THE DRAWINGS

Referring now to the Figures wherein like elements are numbered alike.

DESCRIPTION OF PREFERRED EMBODIMENTS

Figure 1:
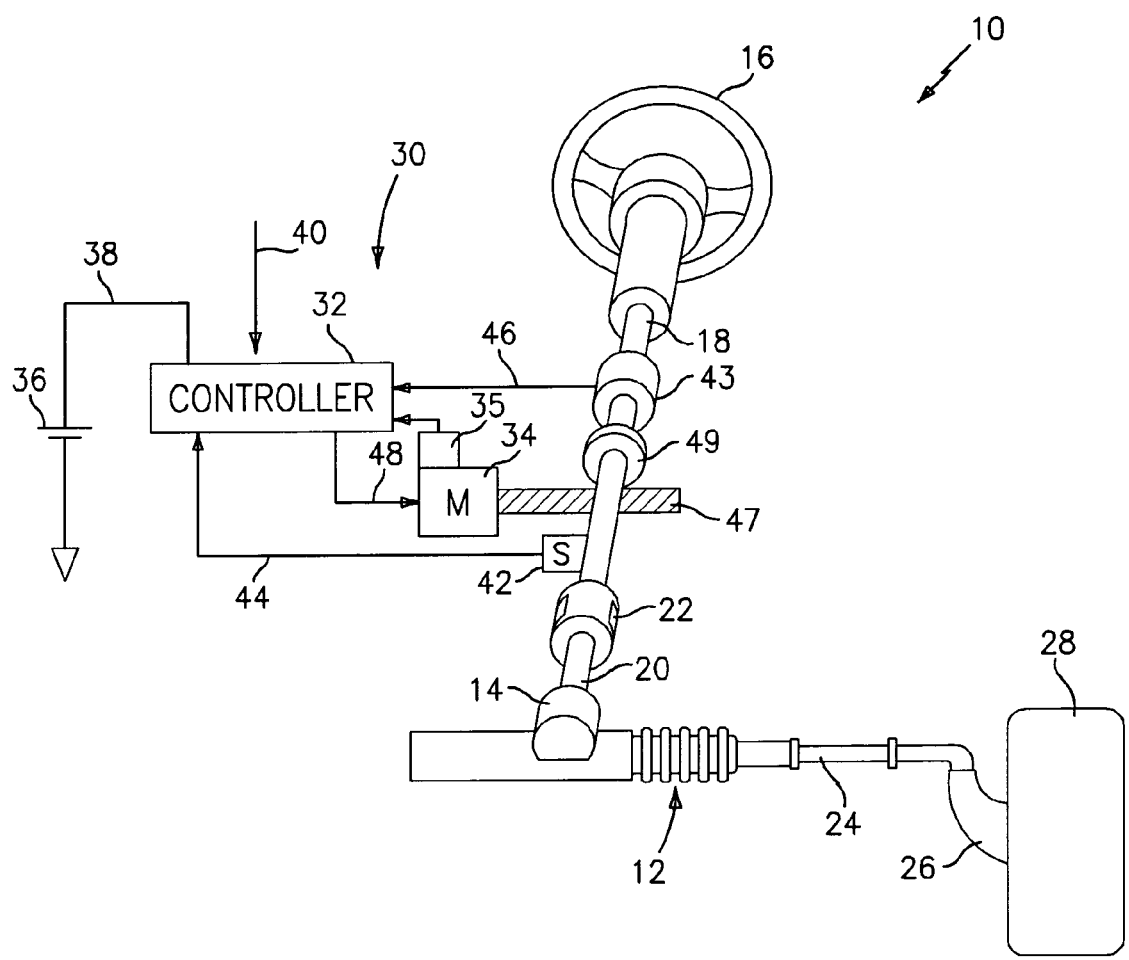
FIG. 1 is a schematic diagram of an electric power steering system having a controller.

Referring to FIG. 1, reference numeral 10 generally designates an electric power steering ("EPS") system for a motor vehicle. A steering mechanism 12 is a rack-and-pinion type mechanism that includes a toothed rack (not shown) and a pinion gear (also not shown) located under a gear housing 14. A hand-wheel 16 is coupled to an upper steering shaft 18. As the hand-wheel 16 is turned, the upper steering shaft 18, which is connected to a lower steering shaft 20 through a universal joint 22, turns the pinion gear. Rotation of the pinion gear moves the toothed rack, which moves tie-rods 24 (only one shown) that, in turn, move steering knuckles 26 (only one shown), which turn wheels 28 (only one shown).

EPS assist torque is provided through an assist unit generally designated by reference numeral 30, which includes a controller 32 and an electric motor 34. A motor position commutation sensor 35 measures the position of the motor 34. The controller 32 is powered by a vehicular power supply 36 through a supply line 38. The controller 32 receives a signal indicative of the vehicle velocity on signal line 40, which signal may be integrated in order to provide a signal indicative of distance traveled. Initial hand-wheel position is measured by position sensor 42 and fed to the controller 32 through line 44. Position sensor 42 may be an optical-encoding type of sensor, a variable resistance type of sensor, or any other suitable type of position sensor for performing the functions of position sensor 42.

As the hand-wheel 16 is turned, the torque sensor 43 senses the torque applied to the hand-wheel 16 by a vehicle operator. The torque sensor 43 may include a torsion bar (not shown) and a variable-resistance type of sensor (also not shown) that outputs a signal to controller 32 through line 46 in relation to the amount of twist on the torsion bar. Other suitable torque-sensing devices used with known signal processing techniques will suffice in alternate embodiments.

In response to the inputs on lines 40, 44 and 46, the controller 32 sends a command signal through line 48 to the electric motor 34. The motor 34, in turn, supplies torque-assist to the steering system through a worm 47 and a worm gear 49, in order to provide a steering torque assist to the vehicular steering system in addition to any steering force exerted by the vehicle operator.

Figure 2:
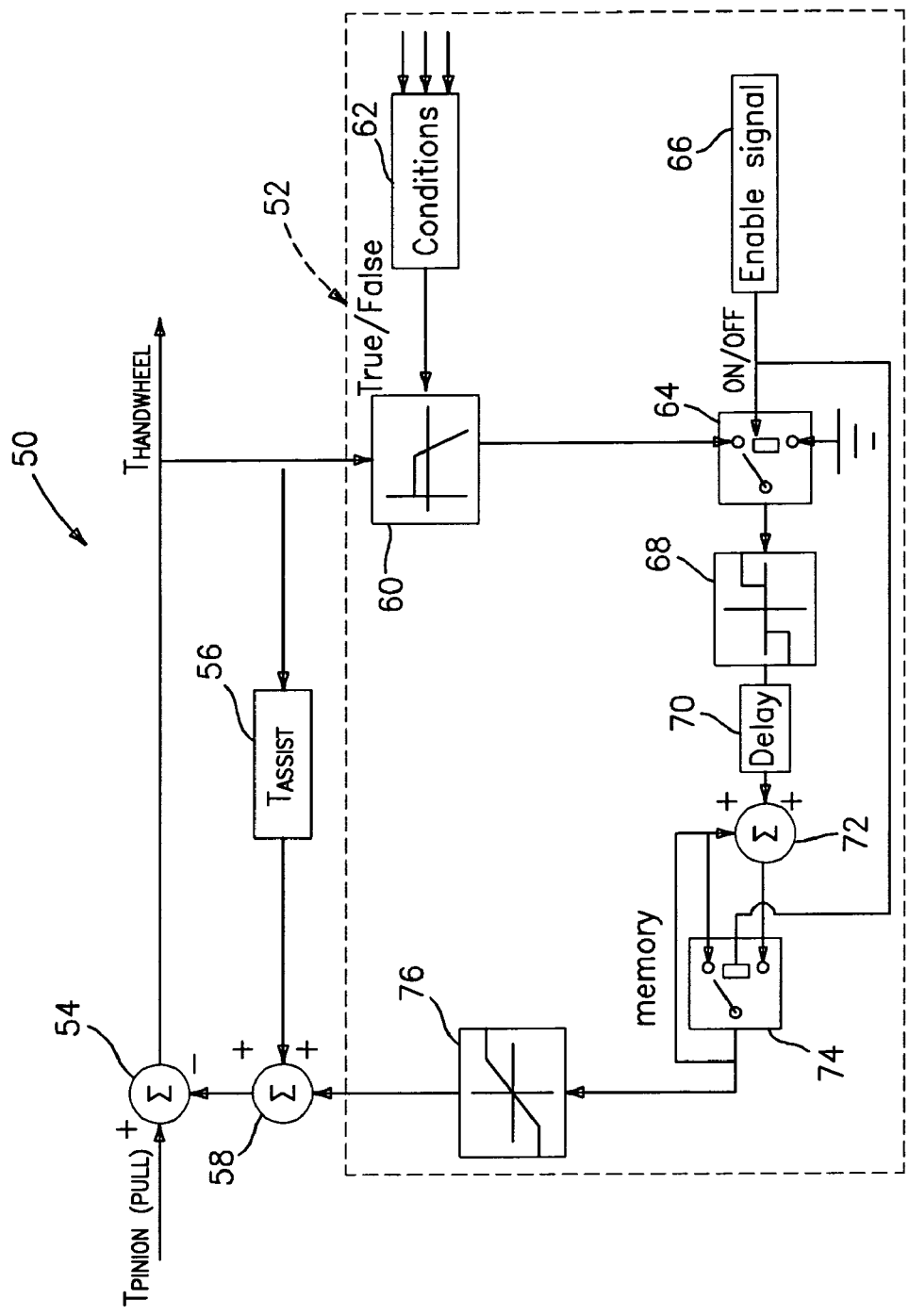
FIG. 2 is a schematic diagram for a portion of the controller of FIG. 1.

As shown in FIG. 2, an EPS control algorithm is indicated generally by the reference numeral 50, which algorithm is implemented by the controller 32 of FIG. 1. The EPS control algorithm 50 includes a robust steering-pull compensator 52. The control algorithm 50 receives a signal indicative of the torque applied to the pinion gear at a non-inverting input of a summing function 54, which generates a signal indicative of the torque applied to the hand-wheel 16 of FIG. 1. A torque assist function 56, as known to those of ordinary skill in the pertinent art, receives the hand-wheel torque signal and produces a signal indicative of the desired assist torque. A summing function 58 receives the assist torque signal at a non-inverting input, and generates a signal to be subtracted from the pinion torque at an inverting input of the summing function 54.

The steering-pull compensator 52 receives the hand-wheel torque signal at a filter 60, which also receives a condition flag from a condition processing block 62. The filter 60 provides an input signal to a primary input terminal of an enabling switch 64, which receives a ground signal on its alternate input terminal and a binary control signal from an enable block 66. The output of the enabling switch 64 is received by a function block 68, which produces an input to a delay unit 70.

The delayed output from unit 70 is received at a non-inverting input of a summing function 72, which provides a signal to an alternate input terminal of a memory switch 74. The memory switch 74 receives its own output signal at its primary input terminal, which output is also received at a non-inverting input of the summing function 72. The control terminal of the memory switch 74 receives the binary control signal from the enable block 66. The output of the memory switch 74 is provided as input to a function block 76, which output is received at a non-inverting input of the summing function 58.

Figure 3:
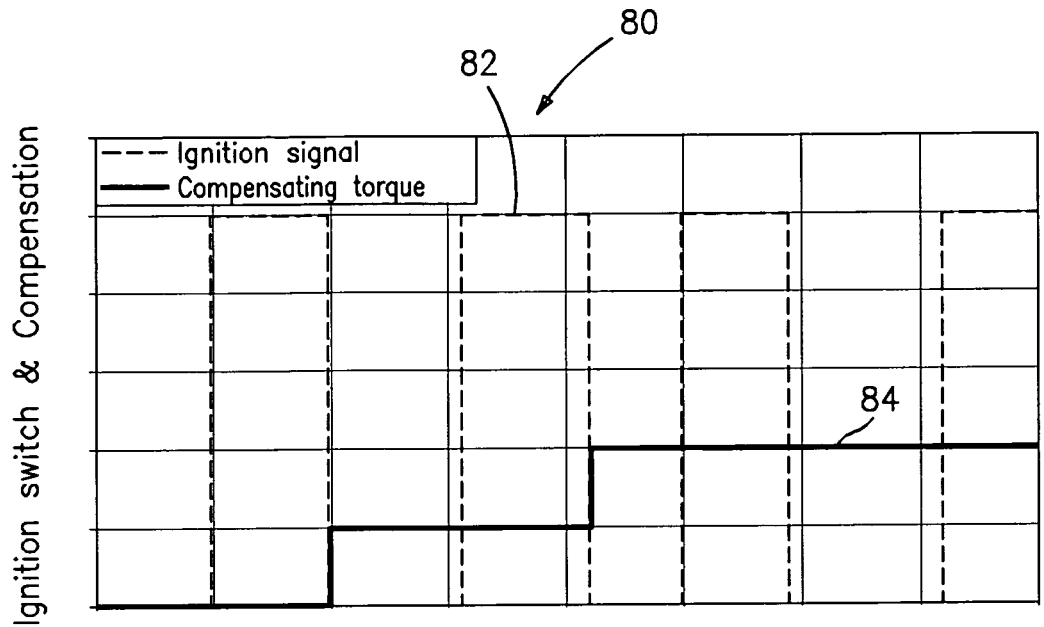
FIG. 3 is a graphical representation of ignition signal and compensating motor torque signals versus time for the electric power steering system of FIG. 1.

Turning now to FIG. 3, a plot of ignition signal and compensating motor torque signals versus time for an exemplary vehicular test of the electric power steering system of FIG. 1 is indicated generally by the reference numeral 80. A binary valued ignition signal trace 82 transitions to ON whenever the vehicle ignition is activated. Assuming, for example, a threshold validational minimum duration requirement of one horizontal unit of the plot 80, which amounts to five minutes in this exemplary embodiment, the first ON cycle of the ignition cycle is shown to meet the minimum duration requirement of one horizontal unit or five minutes. Having met the minimum duration requirement, the first ignition cycle may be considered valid and the compensating torque signal trace 84 computed during the first ignition cycle is updated following the transition of the ignition signal 82 from ON to OFF.

In alternate embodiments, a given ignition cycle may be considered valid if either or both of a minimum durational requirement and/or a minimum distance traveled requirement are met, such as, for example, a minimum durational requirement of five minutes and a minimum distance traveled of three miles. The distance traveled may be obtained, for example, by integrating the vehicle velocity signal received on line 40 of FIG. 1.

Thus, the compensating torque value 84 is updated from zero to the computed compensating torque following the first valid ignition cycle. Likewise, the compensating torque value 84 is updated from its previous value to the newly computed compensating torque value following the second valid ignition cycle. As shown in the exemplary plot 80, the third ignition cycle falls short of the minimum duration requirement of one horizontal unit of the plot 80, and thus the compensating torque value 84 is not updated from its previous value following the third ignition cycle, which was not long enough to be valid.

A fourth and subsequent ignition cycles will only update the compensating torque value 84 following an ignition cycle that meets the minimum duration requirement of one horizontal unit of the plot 80. As will be recognized by those of ordinary skill in the pertinent art based on the teachings herein, any suitable minimum duration requirement and/or minimum distance requirement may be chosen in alternate embodiments in order to meet design criteria.

Figure 4:
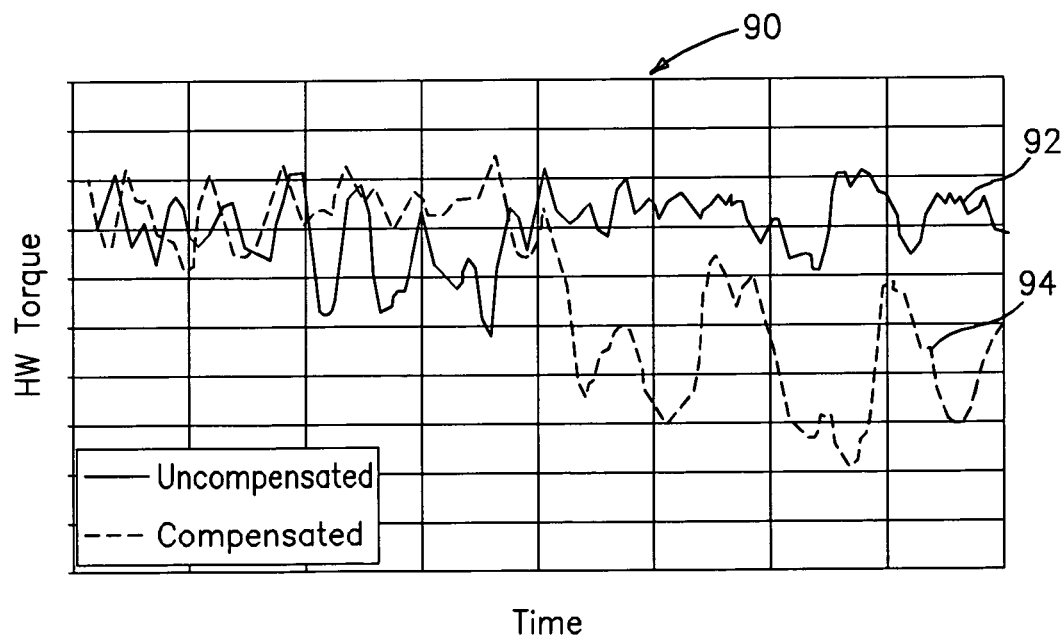
FIG. 4 is a graphical representation of uncompensated hand-wheel torque and compensated hand-wheel torque signals versus time for the electric power steering system of FIG. 1.

As shown in FIG. 4, a comparative plot of uncompensated and compensated hand-wheel torques versus time for the exemplary vehicular test of FIG. 3 is indicated generally by the reference numeral 90. An exemplary uncompensated hand-wheel torque signal trace 92 is shown to include an offset or pull of approximately one Newton-meter ("Nm") in a clockwise direction. In comparison, an exemplary compensated hand-wheel torque signal trace 94 is shown to include an offset or pull that begins at approximately one Newton-meter in a clockwise direction, but is gradually reduced in correspondence with the compensating torque following each successive valid ignition cycle.

In operation, power steering assist is provided by the torque assist function 56 and the summing function 54, where the assist torque is provided as a function of the torque applied at the hand-wheel. The pull compensation scheme is effected by the robust steering-pull compensator 52 in combination with the summing function 58. A combination of vehicle signals received at the condition processing block 62 are used to determine if the vehicle is being driven in a substantially straight path. This information is used, in turn, to conditionally filter the torque applied by the driver at filter 60. If the condition processing block 62 produces a TRUE output indicating that the vehicle is being driven in a substantially straight line, then the torque is filtered. If the condition processing block 62 produces a FALSE output, then the filter value is held to the last value.

An enabling signal produced by the enable block 66 is used to both initiate the calculation of the compensation and its application as an offset to the power steering torque assist. If the enable block 66 produces an ON output, the algorithm acquires the filtered torque and determines the increment to apply at function block 68. As will be recognized by those of ordinary skill in the pertinent art based on the teachings herein, the increment may be a constant increment or quantizer, a proportional increment, or other form of increment suitable to meet design criteria. In addition, a calibratible value may be used such that no increment and no compensation are applied if the measured torque is below a certain threshold. The increment is then delayed at the unit 70 before being added to the last memory value at the summing function 72. The last memory value is scaled and/or limited at function block 76 and applied as an offset to the power steering torque assist at summing function 58.

If the enable block 66 produces an OFF output, the algorithm acquires no torque and produces a zero value at the output of function block 68. However, due to the delay unit 70, the increment calculated during the last enable cycle is added to the last memory value at summing function 72. This value then replaces the last memory value. The next time that the enable block 66 produces an ON output, the new memory value is applied as an offset to the power assist after passing through function block 76.

The function block 76 uses a calibratible value to prevent the pull compensation from exceeding a desired value. The algorithm will continue to reduce the pull torque in the hand-wheel until the value of this torque reaches the lower threshold of the function block 68.

As will be recognized by those of ordinary skill in the pertinent art based on the teachings herein, the calculated compensation may be implemented in several alternate ways, such as, for example, by continuous compensation performed in real-time, by compensation added at beginning of each enable cycle based on values computed in the last cycle, by compensation added at beginning of the enable cycle after a pull condition has been detected over multiple enable cycles with additions to be made to the shown configuration to account for storage and selection of multiple values, or by compensation having a compensation value that can be accessed during vehicle service from the conditionally filtered memory value with correction provided by writing an offset to a memory location in which the conditionally filtered value is stored.

The robust steering-pull compensator 52 accepts the steering hand-wheel torque as one of its inputs and produces a compensating torque command to be added to the regular steering assist command. Thus, when a steering-pull torque is present, the controller will eventually reduce it to a level that the driver should not perceive. The compensating process starts by determining the existence of a residual torque at the steering hand-wheel caused by pull. When the controller determines that the steering hand-wheel torque is most likely an undesirable residual torque while the driver intends to drive substantially straight forward in a steady state, the control algorithm will add an incremental amount of torque value to a memory location holding the command of the compensating torque, which is reset at vehicle assembly or a mechanical service.

The value of the compensating torque is built up over time so the driver feels less steering-pull torque. This compensating torque build-up process can be implemented in various ways, such as, for example, by providing an incremental amount that is proportional to the amount of the sensed steering hand-wheel torque, or by providing an incremental amount that is a fixed minimum quantity which is integrated to give the compensating torque command, or by providing an incremental amount that is a potentially variable compensating step size, or by providing an incremental amount that is a variable integration gain, for example, If the steering-pull condition is corrected by mechanical means, the compensating torque can be reduced by detecting the steering-pull caused by excessive compensating torque command and decrementing the same or by resetting the memory location holding the value of the compensating torque during mechanical service. To determine the existence of the residual torque at the steering hand-wheel, the controller precludes transient vehicle operating conditions. Therefore, the accumulation of steering hand-wheel torque to form the compensating torque command will not take place until a combination of conditions are met.

These conditions may include, for example, that the hand-wheel angle is less than a specified threshold indicating the driver intends to drive in a substantially straight line; that the hand-wheel rate is less than a specified threshold indicating the driver intends to reach a steady-state operation of the vehicle; that a weighted sum of the hand-wheel angle and the hand-wheel angle rate is less than a specified threshold; that the hand-wheel torque is less than a specified threshold; that the hand-wheel torque is greater than a specified threshold; that the hand-wheel torque rate is less than a specified threshold; that the vehicle speed is greater than a specified threshold; that the vehicle speed is less than a specified threshold; that the vehicle acceleration and deceleration level is less than a specified threshold; that the vehicle yaw rate is less than a specified threshold; or that the vehicle heading is not changing. In order to achieve high resolution of small residual efforts, anticipatory and delayed exclusions of data can be employed, based on time histories of the above.

An embodiment of the present disclosure has been reduced to practice on a vehicle equipped with EPS. Tires that create a pull were mounted on the front of the vehicle. The vehicle was then driven both with and without the pull compensation feature turned on. Without compensation, the vehicle had a strong pull torque; but with compensation, the pull torque was reduced to a level indiscernible to the driver.

An advantage of the above-described and other embodiments is that a steering-pull compensation value is stored in a memory address at the end of a cycle upon determination of a valid enabling signal (e.g., an ignition cycle that exceeds a threshold duration). For a cycle having an invalid enabling signal, the value stored at the memory address is not changed.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A controller for a vehicular system, the controller comprising:
   a torque-assist function responsive to a signal indicative of an input device torque for providing a torque-assist command to an electric motor; and
   a steering-pull compensator including a filter responsive to the signal indicative of input device torque, said compensator being responsive to a signal indicative of a valid detection cycle for modifying said torque-assist command to the electric motor by an offset corresponding to a detected steering-pull condition.

2. A controller as defined in claim 1, further comprising:
   at least one summing function in signal communication with said torque-assist function and with said steering-pull compensator for summing the provided torque-assist command with the offset corresponding to a detected input device pull condition.

3. A controller as defined in claim 2, said steering-pull compensator comprising:
   a function block for providing a signal to a non-inverting input of the summing function.

4. A controller as defined in claim 1, said steering-pull compensator comprising:
   a memory switch configured such that an output signal there from is also received as an input at an input terminal.

5. A controller for a vehicular system, the controller comprising:
   a torque-assist function responsive to a signal indicative of an input device torque for providing a torque-assist command to an electric motor; and
   a steering-pull compensator including a condition processing block for determining if the vehicle is being driven in a substantially straight path, said compensator being responsive to a signal indicative of a valid detection cycle for modifying said torque-assist command to the electric motor by an offset corresponding to a detected steering-pull condition.

6. A controller for a vehicular system, the controller comprising:
   a torque-assist function responsive to a signal indicative of an input device torque for providing a torque-assist command to an electric motor; and
   a steering-pull compensator responsive to a signal indicative of a valid detection cycle for modifying said torque-assist command to the electric motor by an offset corresponding to a detected steering-pull condition, said steering-pull compensator further including an enable block for validating the detected steering-pull condition.

7. A controller as defined in claim 6, said steering-pull compensator comprising:

an enabling switch for receiving a binary control signal from said enable block.

8. A controller as defined in claim 7, said steering-pull compensator further comprising:
a delay unit for delaying the offset correction until the enabling switch transitions off-to-on.

9. A controller as defined in claim 8, said steering-pull compensator further comprising:
a summing function for adding the delayed offset correction to a previous offset value.

10. A method for controlling a vehicular system, the method comprising:
receiving a signal indicative of a torque applied to an input device;
providing a torque-assist command to a motor in response to the received torque signal;
detecting an enabling signal;
quantifying a steering-pull condition in response to the received and detected signals;
modifying the torque-assist command to the motor by an offset corresponding to the quantified steering-pull condition;
monitoring a vehicle ignition signal;
recognizing an off-to-on transition of the monitored ignition signal;
disabling the enabling signal in response to the recognized transition;
determining whetter at least one of the duration of the monitored ignition signal exceeds a threshold duration value and the distance traveled by the vehicle exceeds a threshold distance value; and
enabling the enabling signal in correspondence with said determining when the duration exceeds the threshold.

11. A method as defined in claim 10, further comprising:
recognizing a cycle as an off-to-on transition of the monitored ignition signal followed by an on-to-off transition of the monitored ignition signal; and
storing a steering-pull compensation value corresponding to the quantified condition into a memory location upon detecting of an enabled enabling signal for a recognized cycle.

12. A method as defined in claim 11, further comprising:
adding the stored steering-pull compensation value to the provided torque-assist command at the beginning of a cycle in accordance wit the steering-pull compensation value stored in a previous cycle.

13. A method as defined in claim 11, further comprising:
adding the stored steering-pull compensation value to the provided torque-assist command at the beginning of a cycle in accordance with the steering-pull compensation values stored in a plurality of previous cycles.

14. A method as defined in claim 11, further comprising:
retrieving at least one steering-pull compensation value stored in a previous cycle far analysis during vehicle service.

15. A method as defined in claim 11, further comprising:
writing a modified steering-pull compensation value corresponding to an adjusted vehicular mechanical specification into a memory location following corrective vehicle service.

16. A method as defined in claim 11, further comprising:
writing a zero steering-pull compensation value into a memory location following vehicle service.

17. A method as defined in claim 10 wherein the threshold duration value is about five minutes.

18. A method as defined in claim 10 wherein the threshold distance value is about three miles.

19. A vehicular system comprising:
an input device;
a controller in signal communication with said input device;
an electric motor in signal communication with said controller;
said controller comprising:
a torque-assist function responsive to a signal indicative of an input device torque for providing a torque-assist command to said electric motor; and
a steering-pull compensator including a filter responsive to the signal indicative of input device torque, said compensator being responsive to a signal indicative of a valid detection cycle for modifying said torque-assist command to said electric motor by an offset corresponding to a detected steering-pull condition.

20. A vehicular system as defined in claim 19, said controller further comprising:
at least one summing function in signal communication with said torque-assist function and with said steering-pull compensator for summing the provided torque-assist command with the offset corresponding to a detected input device pull condition.

21. A vehicular system as defined in claim 24, said steering-pull compensator comprising:
a function block for providing a signal to a non-inverting input of the summing function.

22. A vehicular system as defined in claim 19, said steering-pull compensator comprising:
a condition processing block for determining if the vehicle is being driven in a substantially straight path.

23. A vehicular system as defined in claim 19, said steering-pull compensator comprising:
an enable block for validating the detected steering-pull condition.

24. A vehicular system as defined in claim 23, said steering-pull compensator comprising:
an enabling switch for receiving a binary control signal from said enable block.

25. A vehicular system as defined in claim 23, said steering-pull compensator further comprising:
a delay unit for delaying the offset correction until the enabling switch transitions off-to-on.

26. A vehicular system as defined in claim 23, said steering-pull compensator further comprising:
a summing function for adding the delayed offset correction to a previous offset value.

27. A vehicular system as defined in claim 23, said steering-pull compensator comprising:
a memory switch for receiving its own output signal at its primary input terminal.

* * * * *